3,152,114
AZO DYESTUFFS
Edgar Siegel and Manfred Söll, Leverkusen, Germany, assignors to Farbenfabriken Bayer Aktiengesellschaft, Leverkusen, Germany, a corporation of Germany
No Drawing. Filed Jan. 26, 1960, Ser. No. 4,628
Claims priority, application Germany Jan. 31, 1959
11 Claims. (Cl. 260—157)

The invention relates to new azo dyestuffs; more particularly it relates to azo dyestuffs of the formula

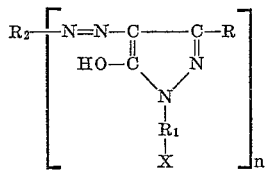

In this formula R stands for hydrogen, a lower alkyl, benzyl, phenyl, —COOH, —COOCH$_3$ and —COOC$_2$H$_5$ group, R$_1$ means a lower alkylene radical with 2–4 carbon atoms between N and X, X stands for Cl, Br, OSO$_3$Y or a sulfonyl hydroxy group, Y being hydrogen or an alkali metal cation, R$_2$ represents the residue of a diazo compound, i.e., a moiety selected from the group consisting of a carbocyclic and a heterocyclic diazo components, and $n$ means one of the integers 1 to 3.

It is an object of the invention to provide valuable azo dyestuffs; a further object is the provision of dyestuffs which are particularly suitable for the dyeing of cellulose-containing materials; still another object is to provide dyestuffs which yield dyeings on cellulose of excellent wet fastness properties.

The new dyestuffs are obtainable by coupling diazotised amines of the aromatic or heterocyclic series, in the 4-position, with pyrazolones of the following composition

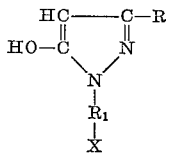

In the formula R, R$_1$ and X have the above significance.

The process for the production of the new dyestuffs can also be varied by first coupling a diazotised amine of the aromatic or heterocyclic series with a pyrazolone of the formula

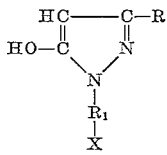

in which R and R$_1$ have the above-mentioned significance, and by converting in the resultant azo compound the hydroxyl group of the 1-positioned hydroxyalkyl radical in the pyrazolone nucleus into the substituent X by usual processes.

Amines suitable as diazo components are aromatic carbocyclic diazo components, for example, aminobenzenes such as 1-aminobenzene-3-sulphonic acid, 1-aminobenzene-3,5-disulphonic acid, 4-aminodiphenyl-3-sulphonic acid, 1-amino-4,5-dichlorobenzene-2-sulphonic acid or anthranilic acid; aminonaphthalenes such as 2-aminonaphthalene-6-sulphonic acid or 2-aminonaphthalene-4,8-disulphonic acid, amino group-containing heterocycles the amino group of which is diazotisable, for example azole diazo components, such as, 2-amino-1,3,5-thiodiazole, 3-amino-1,2,4-triazole, 2-aminobenzthiazole or 6-methyl-2-(4′-aminophenyl)-benzthiazolesulphonic acid; further tetrazo components, such as 4,4′-diaminodiphenyl, 4,4′-diaminodiphenyl-2,2′-disulphonic acid, 4,4′-diamino-5,5′-dimethoxydiphenyl-2,2′-disulphonic acid, 4,4′-diaminostilbene-2,2′-disulphonic acid, 4,4′-diaminodibenzyl-2,2′-disulphonic acid, 3,3′-diamino-dibenzenesulphimide or 4,4′-diamino-diphenylsulphone; compounds having more than two diazotisable amino groups are also applicable, for example the conversion product of copper phthalocyanine tri- or tetra-sulphochloride with 3 or 4 mols of 1,3-diaminobenzene-4-sulphonic acid or 1,4-diaminobenzene-3-sulphonic acid.

The pyrazolones according to the formula

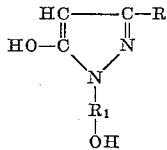

to be used by the first mentioned process are obtainable for example by conversion of 1-(β-hydroxyethyl)-5-pyrazolone with hydrobromic acid, or by esterification with sulphuric acid or chlorosulphonic acid or sulphonylation with alkyl or aryl sulphochlorides. The basic 1-β-hydroxyalkyl-5-pyrazolones which may also be used as coupling components in the modified process are obtainable by the process described in German patent specification No. 850,033.

Suitable pyrazolone coupling components are, for example, those which contain as radical $$\underset{X}{\overset{R_1}{|}}$$

one of the following groups:
—CH$_2$—CH$_2$—Cl, —CH$_2$—CH$_2$—Br, —CH$_2$—CH—CH$_2$—Cl,
$$\underset{OH}{|}$$

—CH$_2$—CH$_2$—OSO$_3$H or —Na, —CH$_2$—CH$_2$—OSO$_2$—⟨ ⟩—CH$_3$
—CH$_2$—CH$_2$—OSO$_2$—CH$_3$

The radical R may be varied in the indicated manner.

The coupling is carried out in a weakly acid to alkaline aqueous or organic medium. Depending on the components used which may contain solubilising groups such as sulphonic acid or carboxylic acid groups, azo dyestuffs are obtained which differ in their water-solubility. Dyestuffs are especially valuable which contain in the molecule several of the said pyrazolone coupling component. Dyestuffs of this kind are obtained by conversion of the pyrazolone coupling components with tetrazo- or poly-diazo compounds.

The new dystuffs are suitable for the dyeing of the most varied materials, especially for the dyeing and printing of hydroxyl group-containing textile materials of natural or regenerative cellulose. Dyeing or prints are obtained on these materials which are outstandingly fast to washing and to boiling by applying the dyestuffs to the dyeing material and subjecting the dyeing goods to the action of acid binding agents, preferably at an elevated temperature.

For dyeing, the dyestuffs are preferably used in an aqueous solution which can be treated with alkaline substances such as alkali metal hydroxide or alkali metal carbonate, or compounds convertible into weakly alkaline substances such as alkali metal bicarbonate. Further auxiliary agents can be added to the solution provided they do not react with the dyestuffs in an undesirable manner. Such additives are, for example, surface-active substances such as alkyl sulphates, substances which prevent migration of the dyestuffs or dyeing assistants such as urea (for improving the solubility and fixation of the dystuffs), or inert thickening agents such as oil-in-water emulsions, tragacanth, starch, alginate or methyl cellulose.

The solutions or pastes thus prepared are applied to the dyeing material, for example by padding in a foulard or by printing, and subsequently heating to an elevated temperature, preferably 40–150° C., for some time. Heating can be carried out in a hotflue, steaming apparatus, on heated rollers or by introduction into hot concentrated salt baths alone or consecutively in any desired sequence.

When a padding liquor or dyebath is used without alkali, a passage of the dry goods through an alkaline solution to which common salt or Glauber salt is added follows. The addition of salt reduces migration of the dyestuff from the fibre.

It is also possible to treat the dyeing material first with one of the aforementioned acid binding agents, then with the solution or paste of the dyestuff and finally, as indicated, to fix the dyestuff at an elevated temperature.

After fixing is completed, the dyeing goods are rinsed hot and, in cases where it is necessary, the dyed material is finally soaped whereby insufficiently fixed dyestuff is removed. Dyeings having excellent wet fastness are obtained.

For printing materials containing hydroxyl groups or amide groups, a printing paste is used consisting of the dyestuff solution a thickening agent such as sodium alginate and an alkaline compound or a compound splitting off alkali upon heating such as sodium carbonate, potassium carbonate or sodium bicarbonate, and the printed material is rinsed and also finally soaped.

Amide group-containing materials such as wool, silk and the like can be dyed in a preferably neutral medium.

The dyeing process is suitably followed by a washing operation in a neutral or alkaline aqueous bath.

Provided that the new dyestuffs are sufficiently water-soluble they can be applied for dyeing or printing from an aqueous solution. Water-insoluble dyestuffs of the type as defined by the invention are advantageously applied in a finely dispersed form.

The following examples are given for the purpose of illustrating the invention.

*Example 1*

17.3 parts by weight of 3-aminobenzene sulphonic acid and 6.95 parts by weight of sodium nitrite are dissolved in 200 parts by volume of water with the addition of a little sodium carbonate at pH 7–8; 28 parts by volume of concentrated hydrochloric acid are added with stirring and cooling with ice. Excess nitrous acid is removed with amido-sulphonic acid after 10 minutes. The clear diazo solution is run into a solution of 29 parts by weight of the hydrobromide of 1-($\beta$-bromethyl)-3-methyl-5-pyrazolone in 150 parts by volume of water and 150 parts by volume of a saturated sodium acetate solution, while cooling with ice. Stirring is continued at pH 4–5 for another 1–2 hours and the clear yellow solution is completely evaporated to dryness in a vacuum. The residual mixture contains about 35% of the dyestuff of the formula

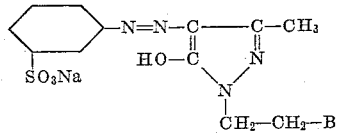

and inorganic salts and is used directly for dyeing.

A cotton fabric is impregnated at 20–25°C. with a solution containing per litre of bath 20 g. of the above dyestuff and 0.5 g. of a non-ionic wetting agent (e.g., a poly-hydroxyethylated oleyl alcohol) as well as 100 g. of urea and 20 g. of sodium hydroxide. The fabric is then squeezed between two rubber rolls to a moisture content of about 100%. After intermediate drying at 50–60° C. the fabric is heated to 140° C. for 10 minutes and the dyeing thus obtained thoroughly washed with hot water, and then treated at the boil with a solution containing per litre 5 g. of Marseilles soap and 2 g. of sodium carbonate. After rinsing and drying a somewhat greenish yellow dyeing of very good fastness to wet treatment, rubbing and light is obtained.

*Example 2*

17.1 parts by weight of 4,4′-diamino-diphenyl-2,2′-disulphonic acid and 6.95 parts by weight of sodium nitrite are dissolved in 200 parts by volume of water with the addition of a little sodium carbonate at a pH of 7–8, 28 parts by volume of concentrated hydrochloric acid are added with ice-cooling and the mixture stirred for 30 minutes. After the diazo suspension is freed from excess nitrous acid with amidosulphonic acid, it is run with ice-cooling into a solution of 29 parts by weight of the hydrobromide of 1-($\beta$-bromethyl)-3-methyl-5-pyrazolone in 150 parts by volume of water and 150 parts by volume of a saturated sodium acetate solution. Coupling is rapidly completed at a pH of 5 and the mixture stirred for a further hour. The resultant dyestuff of the formula

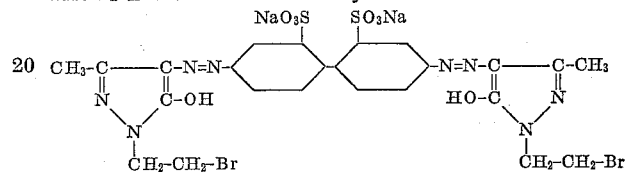

is salted out by the addition of 100 parts by weight of common salt, filtered off with suction, washed with a dilute common salt solution and dried either in the air or in a vacuum drying oven at 40° C.

A fibre material of regenerated cellulose is impregnated at 20–25° C. with a solution containing per litre of liquor 15 g. of the dyestuff obtained according to the aforesaid instruction, as well as 50 g. of urea and 20 g. of sodium carbonate. The fabric is subsequently squeezed to a moisture content of about 100%, intermediately dried at 50–60° C. and steamed at 105° C. for 8 minutes in a steaming apparatus. The dyeing thus obtained is thoroughly rinsed with hot water and treated at boiling temperature for 20 minutes with a solution containing per litre 5 g. of Marseilles soap and 2 g. of sodium carbonate. After rinsing and drying an intense yellow dyeing of very good fastness to wet treatment, rubbing and light is obtained.

*Example 3*

18.6 parts by weight of 4,4′-diamino-dibenzyl-2,2′-disulphonic acid and 6.95 parts by weight of sodium nitrite are dissolved in 200 parts by volume of water with the addition of a little sodium carbonate at a pH of 7–8, 28 parts by volume of concentrated hydrochloric acid are added while cooling with ice and the mixture stirred for 30 minutes. After the diazo suspension is freed from excess nitrous acid with amidosulphonic acid, it is run with ice-cooling into a solution of 29 parts by weight of the hydrobromide of 1-($\beta$-bromethyl)-3-methyl-5-pyrazolone in 150 parts by volume of water and 150 parts by volume of a saturated sodium acetate solution. Coupling is rapidly completed at a pH of 5 and the mixture stirred for a further hour. The resultant dyestuff of the formula

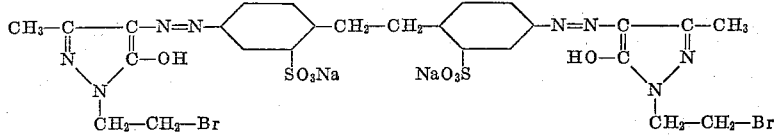

is salted out by the addition of 100 parts by weight of common salt, filtered off with suction, washed with a dilute common salt solution and dried either in the air or in a vacuum drying oven at 40° C.

The same dyestuff may be obtained in the following manner:

18.6 parts by weight of 4,4′-diamino-dibenzyl-2,2′-disulphonic acid are diazotized in the manner described above, and the suspension of the diazo compound is run into a solution of 14.5 parts by weight of 1-($\beta$-hydroxyethyl)-3-methyl-5-pyrazolone in 150 parts by volume of water and 80 parts by volume of a saturated sodium acetate solution. Coupling is rapidly completed at a pH of 5. The mixture is stirred for a further hour and then re-acidified with hydrochloric acid to a pH of 3–4. The precipitated dyestuff is filtered off with suction, washed with water and dried at 80° C. The dry dyestuff is finely powdered and stirred in a mixture of 100 parts by volume of concentrated hydrobromic acid (*d* 1.5) and 20 parts by volume of concentrated sulphuric acid under reflux (at 127° C.) for 8 hours. After cooling, the dyestuff is precipitated from the orange-coloured suspension by the addition of 250 parts of a saturated common salt solution, filtered off with suction, washed with an acidified dilute common salt solution and either dried in the air or in a vacuum at 40° C.

15 g. of the dyestuff obtained according to the process described above are mixed with 100 g. of urea, 300 ml. of water are then added at 40° C. and the mixture is stirred until the dyestuff is completely dissolved. This solution is slowly stirred in 500 g. of a sodium alginate thickening (60 g. of sodium alginate per kg. of thickening), the mixture is made up with cold water to a total weight of 960 g. and 20 g. of sodium hydroxide dissolved in 20 ml. of water are added to the mixture.

A cotton fabric is printed with the resultant printing paste dried, steamed at 105° C. for 8 minutes and further treated as usual. A deep yellow print of very good fastness to wet processing, rubbing and light is obtained.

Example 4

20.1 parts by weight of 4,4'-diamino-5,5'-dimethoxy-diphenyl-2,2'-disulphonic acid and 6.95 parts by weight of sodium nitrite are dissolved in 200 parts by volume of water with the addition of a little sodium carbonate at a pH of 7–8, 28 parts by volume of concentrated hydrochloric acid are added with ice cooling and the mixture stirred for 30 minutes. After the diazo suspension is free of excess nitrous acid with amidosulphonic acid, it is run into a solution of 29 parts by weight of the hydrobromide of 1-(β-bromethyl)-3-methyl-5-pyrazolone in 150 parts by volume of water and 150 parts by volume of a saturated sodium acetate solution. Coupling is rapidly completed at a pH of 5 and the mixture stirred for a further hour. The resultant dyestuff of the formula

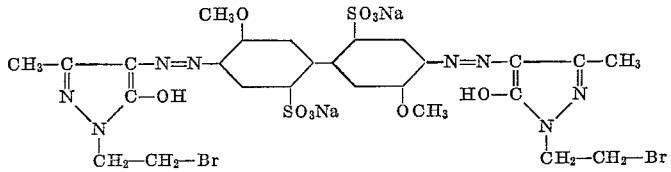

is salted out by the addition of 100 parts by weight of common salt, filtered off with suction and dried either in the air or at 40° C. in a vacuum drying oven.

A cotton fabric is padded with a neutral solution containing per litre 15 g. of the dyestuff obtained, squeezed to a moisture content of 100%, dried at 50–60° C. padded again with a cold solution containing per litre 300 g. of common salt and 20 g. of sodium hydroxide, again squeezed to a moisture content of about 100% and heated to 140° C. for 10 minutes. After rinsing, soaping at the boil, renewed rinsing and drying, an intense reddish yellow dyeing of very good fastness to wet processing and rubbing and good fastness to light is obtained.

Example 5

46.9 parts by weight of the tri-(amino-sulphophenyl-sulphonamide), described below, and built up from copper phthalocyanine and 6.95 parts by weight of sodium nitrite are dissolved in 500 parts by volume of water with the addition of a little sodium carbonate at a pH of 7–8, and the mixture is then cooled to 0–5° C. The blue solution is then slowly run with stirring and ice cooling into a mixture of 28 parts by volume of concentrated hydrochloric acid and 200 parts by weight of ice, the green barely soluble diazo compound thus being instantaneously formed. It is stirred with ice cooling for 30 minutes, the excess nitrous acid removed with amidosulphonic acid and the diazo suspension combined with stirring and ice cooling with a solution of 29 parts by weight of the hydrobromide of 1-(β-bromethyl)-3-methyl-5-pyrazolone in 150 parts by volume of water and 150 parts by volume of a saturated sodium acetate solution. Coupling is rapidly completed at a pH of 5. The mixture is stirred for a further hour and the green dyestuff of the formula

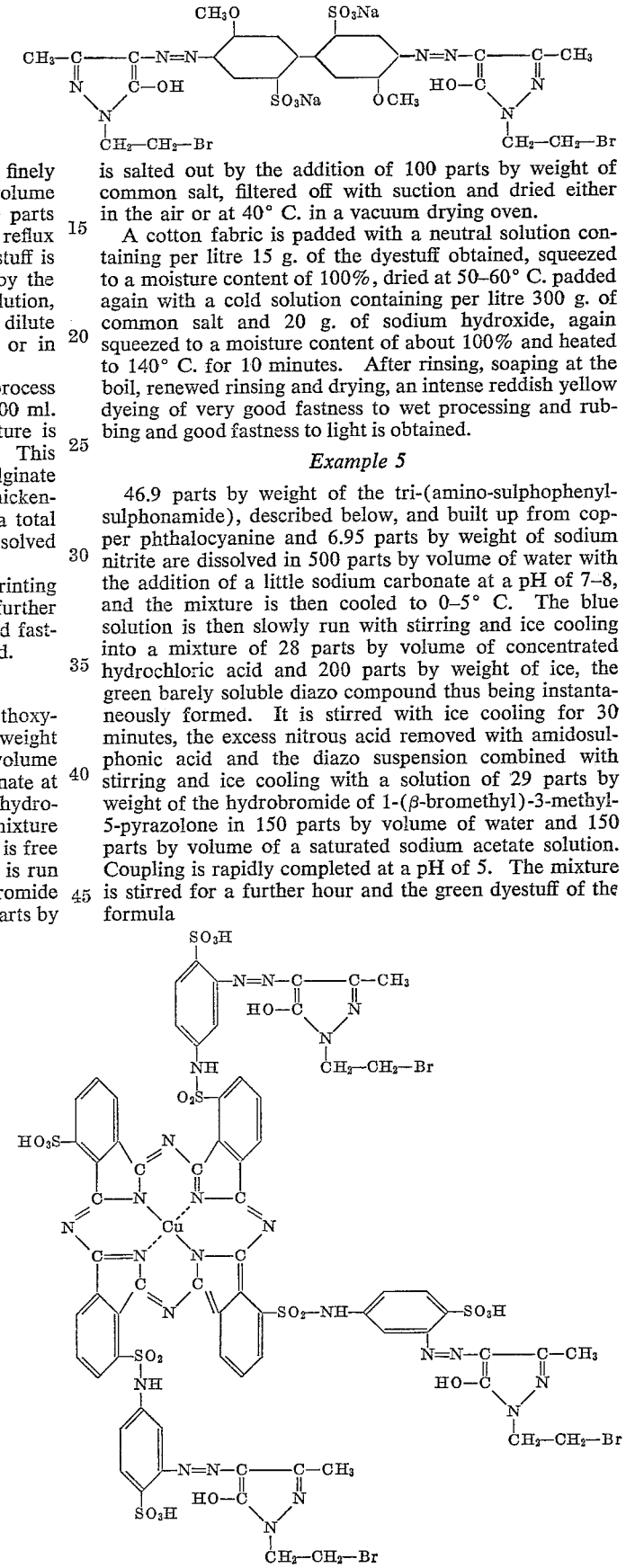

is salted out by the addition of 100 parts by weight of common salt, filtered off with suction, washed with a dilute common salt solution and the product is dried either in the air or at 40° C. in a vacuum.

The triamine used may be prepared by introducing 1 mol of copper phthalocyanine-tretrasulphochloride into an ice-cold solution of 8 mol of 2,4-diaminobenzene-sulphonic acid and 400 parts by weight of sodium acetate in 8000 parts by volume of water, stirring at room temperature and a pH of 5 for 15 hours, after neutralizing with sodium carbonate stirring at a pH of 7 for a further two hours and finally stirring the mixture rendered strongly sodium-alkaline at 80° C. for a half hour. The copper phthalocyanine-triamine is isolated by acidifying the clear blue solution with concentrated hydrochloric acid and filtration of the precipitated dyestuff.

A cotton fabric is treated according to the instructions given in Example 1 with a solution containing per litre of liquor 15 g. of the above dyestuff as well as the additives mentioned in Example 1. The cotton fabric is then dyed in bright yellowish green shades of very good fastness of wet treatment and rubbing and of good fastness to light.

*Example 6*

18.5 parts by weight of 4,4'-diaminostilbene-2,2'-disulphonic acid and 6.95 parts by weight of sodium nitrite are dissolved in 200 parts by volume of water with the addition of a little sodium carbonate at a pH 7–8, 28 parts by volume of concentrated hydrochloric acid are added with ice cooling and the whole stirred for 30 minutes. After the diazo suspension is freed from excess nitrous acid with amidosulphonic acid, it is run into a solution of 29 parts by weight of the hydrobromide of 1-(β-bromethyl)-3-methyl-3-pyrazolone in 150 parts by volume of water and 150 parts by volume of a saturated sodium acetate solution. The coupling is rapidly completed at a pH 5 whereupon the mixture is stirred for another hour. The resultant dyestuff of the formula

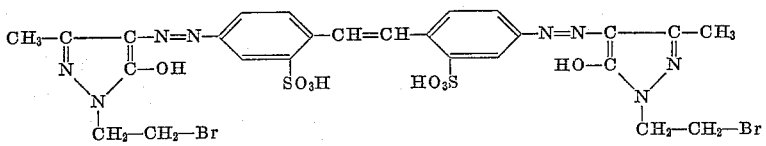

is salted out by the addition of 100 parts by weight of common salt, filtered off with suction, washed with a dilute common salt solution and dried in the air or at 40° C. in a vacuum drying oven.

50 g. of a cotton skein are dyed in 1 litre of a dye bath which contains 1.5 g .of the above dyestuff by raising the temperature from 20° to about 80° C. within 30 minutes, adding a total of 50 g. of common salt in several portions, then adding 10 g. of sodium hydroxide, raising the temperature to about 95° C. and maintaining at this temperature for 30 minutes. After rinsing, soaping at the boil and drying an orange dyeing is obtained having a very good fastness to wet processing and to rubbing.

*Example 7*

If in Example 5 46.9 parts by weight of the copperphthalocyanine - tri-(aminosulfophenyl)-sulfonamide are replaced by 44.7 parts by weight of the 1,4-diaminoanthraquinone derivative described below and otherwise proceeding in the same manner a green dyestuff of the following structure is obtained:

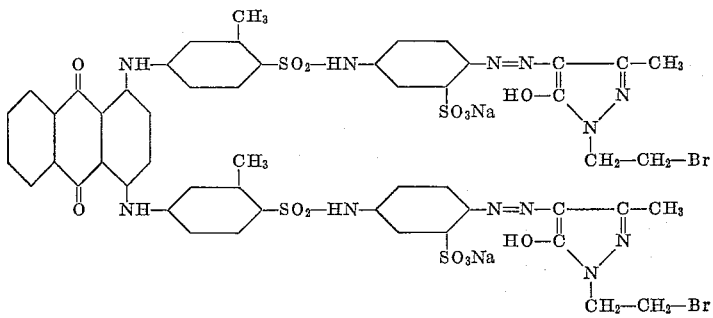

The diamino-anthraquinone derivative to be used in this example is prepared by stirring a cold aqueous solution of excess 2,5-diaminobenzene-sulfonic acid with the disulfochloride which has been prepared by action of chlorosulfonic acid upon 1,4-di-(3'-methylphenylamino)-anthraquinone.

Cotton fabric is treated according to the process described in Example 1 with a solution which contains 15 g. of the above dyestuff per litre and the additives indicated in Example 1. Clear green shades are thus obtained of very good fastness to wet processing and to rubbing.

*Example 8*

In the process of Example 3 29 parts by weight of the hydrobromide of 1-(β-bromoethyl)-3-methyl-5-pyrazolone are replaced by 16.1 parts by weight of 1-(β-chloroethyl)-3-methyl-5-pyrazolone. The yellow dyestuff of the following formula is obtained:

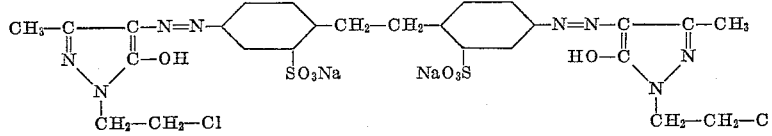

The pyrazolone derivative may be produced by treating 1-(β-hydroxyethyl)-3-methyl-5-pyrazolone with a mixture of concentrated hydrochloric acid and concentrated sulfuric acid.

A cotton fabric is printed according to the method indicated in Example 3 with a printing paste containing 20 g. of the above mentioned dyestuff per kg., damped and aftertreated in usual manner. A greenish yellow print is thus obtainable which exhibits very good fastness to wet processing, rubbing and to light.

If in Example 3 the pyrazolone coupling component is replaced by 22.5 parts by weight of the sulfuric acid semi-ester of 1-(β-hydroxyethyl)-3-methyl-5-pyrazolone a yellow dyestuff having the following structure is obtainable:

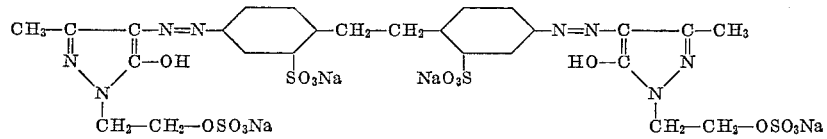

The dyestuff is isolated by adding concentrated hydrochloric acid to the reaction mixture until strong acid medium is attained and subsequently salting out with common salt. The product thus obtained is yellowish brown colored and is mixed with about 40 parts by weight of solid sodium acetate and dried.

A cotton fabric is printed in accordance with the procedure described in Example 3 with a printing paste containing 40 g. of the dyestuff/sodium acetate mixture per kg., steamed and aftertreated in customary manner. One obtains a yellow print having very good fastness to wet processing and to rubbing.

Example 9

32 parts by weight of 2-(3'-sulfo-4'-aminophenyl)-6-methylbenzthiazole and 6.95 parts by weight of sodium nitrite are dissolved with the addition of some soda at pH 7 to 8 in 200 parts by volume of water; 28 parts by volume of concentrated hydrochloric acid are added while cooling with ice and the mixture is then stirred for 30 minutes. Excess nitrous acid is then destroyed with amido sulfonic acid and the diazonium salt solution allowed to run with ice cooling into a solution of 29 parts by weight of the hydrobromide of 1-(β-bromoethyl)-3-methyl-5-pyrazolone in 150 parts by volume of water and 150 parts by volume of concentrated sodium acetate solution. The coupling is completed at pH 5 and the precipitated dyestuff of the formula

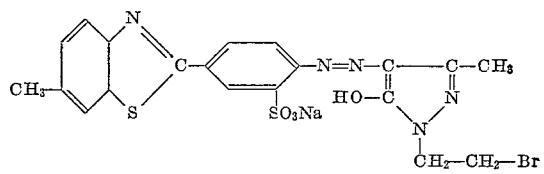

filtered with suction, washed with dilute sodium chloride solution and dried.

A fabric of natural or regenerated cellulose is dyed according to the method described in Example 1 with a solution which contains 15 g. of the above dyestuff per litre and the additives mentioned in the dyeing procedure in Example 1. Reddish yellow shades are thus obtained which distinguish themselves by very good fastness to wet processing and to rubbing.

Example 10

12.65 parts by weight of 4,4'-diamino-2,2'-dichlorodiphenyl in 200 parts by volume of water are diazotised with ice cooling by means of 28 parts by volume of concentrated hydrochloric acid and 6.95 parts by volume of sodium nitrite. After removal of exceeding nitrous acid with amido sulfonic acid the tetrazonium solution is allowed to run while cooling with ice into a solution of 29 parts by weight of the hydrobromide of 1-(β-bromoethyl)-3-methyl-5-pyrazolone in 150 parts by volume of water and 150 parts by volume of concentrated sodium acetate solution. The coupling is finished at pH 5 and the precipitated dyestuff of the formula

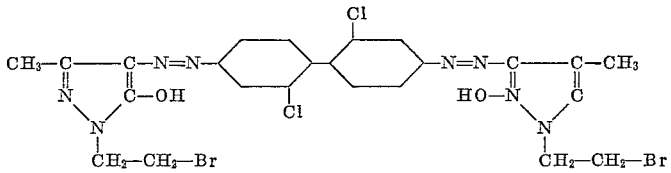

filtered with suction, washed with water and air-dried or dried at 40° C. in vacuo. The dyestuff may be used in the same manner as the product in the preceding examples.

Example 11

18.6 parts by weight of 4,4'-diaminodibenzyl-2,2'-disulfonic acid (component A) and 6.95 parts by weight of sodium nitrite are dissolved with the addition of some soda at pH 7 to 8 in 200 parts by volume of water. 28 parts by volume of concentrated hydrochloric acid are added while cooling with ice and stirring is continued for 30 minutes. After removal of the excess nitrous acid 39.5 parts by weight of the sodium salt of 2-(3'-methyl-5'-aminobenzoyl) - amino - 5 - hydroxynaphthalene-7-sulfonic acid (component B) and 21 parts by weight of calcinated soda in 1000 parts by volume of water are added while cooling with ice. The coupling sets in immediately at a pH of about 8. The dyestuff which after completion of the coupling is completely precipitated is filtered by suction, washed with dilute sodium chloride solution and again pasted with 1000 parts by volume of water and 28 parts by volume of concentrated hydrochloric acid. While cooling with ice a solution of 6.9 parts by weight of sodium nitrite is added and the reaction mixture stirred for 2 hours to complete the diazotisation. An excess of nitrous acid is destroyed with amido sulfonic acid and then a solution of 29 parts by weight of the hydrobromide of 1-(β-bromoethyl)-3-methyl-5-pyrazolone (component C) in 150 parts by volume of water and 150 parts by volume of concentrated sodium acetate solution added with cooling. The coupling is soon complete and stirring then continued for 1 hour. The dyestuff thus formed corresponds to the formula

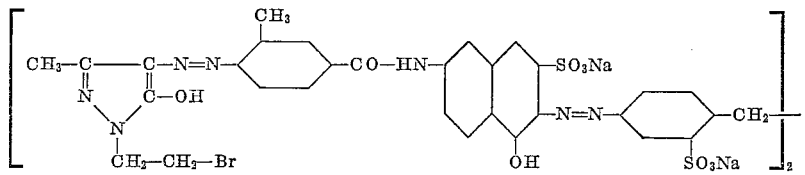

and is nearly completely precipitated. It can be filtered by suction and after thoroughly washing with diluted sodium chloride solution air-dried or dried at 40° C. in vacuo.

A cotton fabric is treated in accordance with the method described in Example 1 with a solution which contains 15 g. of the above said dyestuff and the additives used in the dyeing process of Example 1. The fabric is then thoroughly soaped at the boil, brilliant somewhat yellowish red shades thus being obtained of very good fastness to wet processing and to rubbing.

If processing in the manner described above with the use of the components A, B and C listed in the following table one likewise obtains red to yellowish red dyestuffs which in accordance with the dyeing and printing processes shown in Examples 1 to 6 yield dyeings and prints on cellulose containing fibrous material of good fastness properties, particularly of very good fastness to wet processing.

We claim:
1. An azo dyestuff of the formula

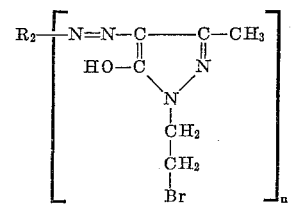

| Component A | Component B | Component C | Shade of the dyeing on cellulose |
|---|---|---|---|
| 4,4'-diamino-dibenzyl-2,2'-disulfonic acid. | 2-(3'-aminobenzoyl)-amino-5-hydroxynaphthalene-7-sulfonic acid. | Hydrobromide of the 1-(β-bromoethyl)-3-methyl-5-pyrazolone. | Yellowish red. |
| Do | 2-(4'-aminophenyl-sulfonyl)-amino-(5-hydroxynaphthalene-7-sulfonic acid). | ____do____ | Do. |
| Succinic acid-N,N'-di-(4'-amino-3'-sulfophenyl)-amide. | 2-((4'''-aminophenylacetyl)-4'-aminobenzoyl)-amino-5-hydroxynaphthalene-7-sulfonic acid. | ____do____ | Bluish red. |
| 4,4'-diamino-diphenyl-2,2'-disulfonic acid. | 2-(4'-amino-phenoxyacetyl)-amino-5-hydroxy-naphthalene-7-sulfonic acid. | ____do____ | Yellowish red. |
| Ethylenediamine-N,N'-di-(4'-aminophenyl)-sulfonamide. | 2-(4'-aminophenylacetyl)-amino-5-hydroxynaphthalene-7-sulfonic acid. | ____do____ | Orange. |
| 2,4-bis-(4'-aminobenzyl-amino)-6-(β-sulfoethyl-amino)-1,3,5-triazine. | 2-(4'-aminophenylacetyl)-amino-5-hydroxynaphthalene-7-sulfonic acid. | ____do____ | Yellowish red. |

*Example 12*

34.2 parts by weight of 4,4'-diamino-diphenyl-2,2'-disulfonic acid and 13.9 parts by weight of sodium nitrite are dissolved while adding some soda at pH 7 to 8 in 400 parts by volume of water, and 56 parts by volume of concentrated hydrochloric acid are added with cooling. The reaction mixture is stirred for 30 minutes and excess nitrous acid then removed by adding amido sulfonic acid. A solution of 29 parts by weight of the hydrobromide of 1-(β-bromoethyl)-3-methyl-5-pyrazolone in 200 parts by volume of water is then added with ice cooling. The pH value of the strong mineral acid mixture is increased to a pH of 2 to 3 by means of adding crystallised sodium acetate with stirring. After stirring for 1 hour with ice cooling the yellow diazomonoazo compound is obtained.

The mixture is then adjusted with soda to pH 5 and allowed to run with stirring in the ice cold solution of 30.2 parts by weight of the sodium salt of succinic acid-N,N'-di-(5-hydroxy-7-sulfonaphthyl-[2])-amide and 22 parts by weight of calcinated soda in 600 parts by volume of water. At pH 8 the coupling has rapidly completed. The dyestuff thus formed corresponds to the formula

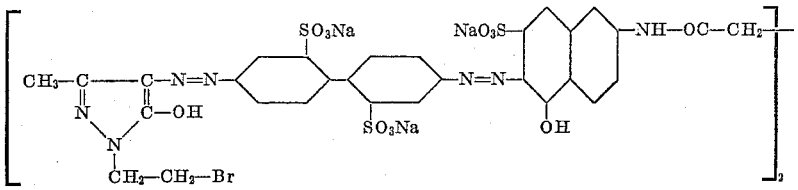

and is completely precipitated in the cold while adding common salt, filtered by suction, washed with dilute sodium chloride solution and dried at 40° C. in vacuo.

A cotton fabric is treated according to the method indicated in Example 1 with a solution which contains 15 g. of the dyestuff mentioned above. Clear yellowish red shades of very good fastness to wet processing and to rubbing are thus obtained.

wherein $R_2$ is a member selected from the group consisting of an aromatic carbocyclic diazo component and an azole diazo component, and $n$ stands for a whole number within the range of 1–3.

2. A dyestuff according to claim 1 wherein $R_2$ stands for a benzene moiety as a diazo component and $n$ stands for the integer 2.

3. A dyestuff according to claim 1 wherein $R_2$ stands for a stilbene moiety as a diazo component and $n$ stands for the integer 2.

4. A dyestuff according to claim 1 wherein $R_2$ stands for a diphenyl moiety as a diazo component and $n$ stands for the integer 2.

5. A dyestuff according to claim 1 wherein $R_2$ stands for a dibenzyl moiety as a diazo component and $n$ stands for the integer 2.

6. A dyestuff according to claim 1 wherein $R_2$ stands for a disulfo-dibenzyl moiety as a diazo compound and $n$ for 2.

7. The dyestuff which in the free acid state corresponds to the formula

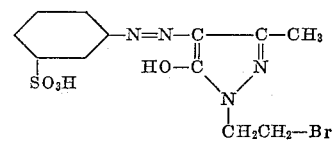

8. The dyestuff which in the free acid state corresponds to the formula

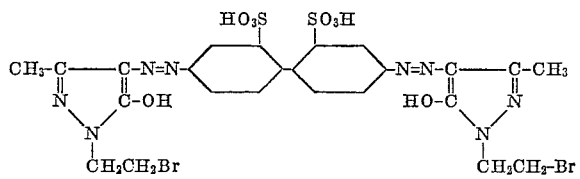

9. The dyestuff which in the free acid state corresponds to the formula

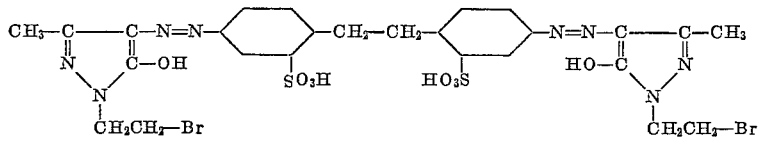

10. The dyestuff whch in the free acid state corresponds to the formula

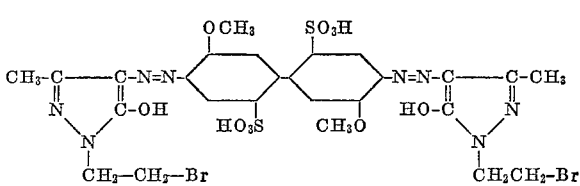

11. The dyestuff which in the free acid state corresponds to the formula

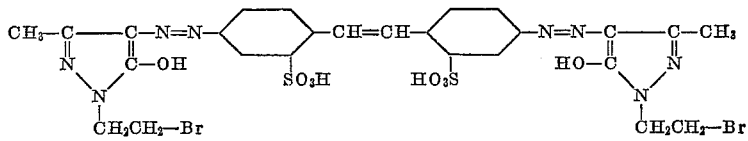

References Cited in the file of this patent

UNITED STATES PATENTS

| | | |
|---|---|---|
| 1,775,605 | Schweitzer | Sept. 9, 1930 |
| 1,973,635 | Lantz | Sept. 11, 1930 |

FOREIGN PATENTS

| | | |
|---|---|---|
| 406,532 | Italy | Dec. 2, 1943 |
| 791,443 | Great Britain | Mar. 5, 1958 |
| 1,140,191 | France | July 16, 1957 |

OTHER REFERENCES

Guthrie: "American Dyestuff Reporter," January 7, 1952, pp. 13–14 and 30.

Wagmann: "Textil-Praxis," 1958, October, pp. 1056–1061.